United States Patent
Hamo et al.

(10) Patent No.: US 12,169,634 B2
(45) Date of Patent: Dec. 17, 2024

(54) ASYNCHRONOUS OPERATION COMPLETION NOTIFICATION

(71) Applicant: Western Digital Technologies, Inc., San Jose, CA (US)

(72) Inventors: Eyal Hamo, Naharia (IL); Tomer Spector, Kibbutz Ginegar (IL); Sagi Taragan, Ramat Ishay (IL)

(73) Assignee: Western Digital Technologies, Inc., San Jose, CA (US)

( * ) Notice: Subject to any disclaimer, the term of this patent is extended or adjusted under 35 U.S.C. 154(b) by 49 days.

(21) Appl. No.: 17/852,360

(22) Filed: Jun. 29, 2022

(65) Prior Publication Data
US 2024/0004556 A1    Jan. 4, 2024

(51) Int. Cl.
*G06F 3/06* (2006.01)

(52) U.S. Cl.
CPC .......... *G06F 3/0619* (2013.01); *G06F 3/0625* (2013.01); *G06F 3/0659* (2013.01); *G06F 3/0679* (2013.01)

(58) Field of Classification Search
CPC .... G06F 3/0619; G06F 3/0625; G06F 3/0659; G06F 3/0679
See application file for complete search history.

(56) References Cited

U.S. PATENT DOCUMENTS

| | | | | |
|---|---|---|---|---|
| 8,117,623 B1* | 2/2012 | Malasky | ............... | H04L 65/403 719/329 |
| 2001/0037433 A1* | 11/2001 | Dempsey | ............. | G06F 12/123 711/E12.04 |
| 2008/0077722 A1* | 3/2008 | Tang | ..................... | G06F 13/385 710/49 |
| 2010/0281201 A1* | 11/2010 | O'Brien | .............. | G06F 13/4027 710/308 |
| 2011/0138192 A1* | 6/2011 | Kocher | ................... | H04L 9/088 713/189 |
| 2012/0144156 A1* | 6/2012 | Matsuda | ............. | G06F 11/0778 712/E9.002 |
| 2017/0083402 A1* | 3/2017 | Vishne | .................... | G06F 12/00 |
| 2018/0046522 A1* | 2/2018 | Adamson | ................ | G06F 9/544 |
| 2018/0192471 A1* | 7/2018 | Li | ........................... | H04W 4/60 |
| 2019/0182329 A1* | 6/2019 | Moss | ...................... | G06N 20/00 |
| 2019/0370128 A1* | 12/2019 | Sadavarte | ............... | G06F 3/065 |
| 2021/0374079 A1* | 12/2021 | Shin | ....................... | G06F 13/382 |
| 2022/0129144 A1* | 4/2022 | Carrigan | ............. | G06F 21/6236 |

(Continued)

*Primary Examiner* — Nanci N Wong
(74) *Attorney, Agent, or Firm* — Patent Law Works LLP

(57) ABSTRACT

A data storage device comprising a non-volatile storage medium configured to store data, a data port configured to receive and transmit data between a host computer system and the data storage device, and a controller. The controller is configured to receive, via the data port, a notification activation, and receive, via the data port, a command data structure comprising a command for the data storage device to perform an operation. The controller is further configured to in response to receiving the command data structure, perform the operation, the operation being defined by an in-progress state and a completed state, and in response to determining that the operation is in the completed state and in response to determining the notification activation, transmit, via the data port, a response data structure comprising an indication that the operation is in the completed state.

20 Claims, 11 Drawing Sheets

(56) References Cited

U.S. PATENT DOCUMENTS

| | | | |
|---|---|---|---|
| 2022/0138059 A1* | 5/2022 | Lee .................... | G06F 3/067 |
| | | | 714/4.5 |
| 2023/0236730 A1* | 7/2023 | Kanno ................ | G06F 3/0679 |
| | | | 711/103 |

* cited by examiner

ASYNCHRONOUS OPERATION COMPLETION NOTIFICATION

TECHNICAL FIELD

This disclosure relates to the communication between a data storage device and a host computer system. In particular, this disclosure relates to the notifying the host computer system of completion of an operation performed by the data storage device.

BACKGROUND

Data storage devices (DSDs) are electronic devices with the capability to store information in the form of digital data. DSDs are typically deployed as an integrated part of, or as a removable component configured to interface with, a computing system for the purpose of improving the data transmission and storage capabilities of the computing system. From the perspective of the computing system, a DSD may be implemented as a block storage device where the data stored is in the form of one or more blocks, being sequences of bytes or bits having a maximum length, referred to as block size.

DSDs may be used to supplement the data storage capabilities of a host computer system. For example, external DSDs are often standalone physical devices which house an internal storage component, such as a hard disk drive (HDD) or a solid state drive (SSD), that provides a host computing system with an additional portion of non-volatile memory (i.e., the volume of the drive) in which to store digital data. These external drive type devices are connectable to the host computer system via a data path operating over a particular connectivity protocol (e.g., via Universal Serial Bus (USB) cable). Integrated DSDs may form a component of a larger system in which a host component utilises the integrated DSD to store data.

A host computer system may instruct a DSD to perform an operation, such as a write operation, a data erase operation or an initialisation operation. In some situations, it is desirable for the host computer system to determine when the DSD has completed performing the instructed operation.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this specification, a statement that an element may be "at least one of" a list of options is to be understood to mean that the element may be any one of the listed options, or may be any combination of two or more of the listed options.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited.

SUMMARY

Disclosed herein is a data storage device comprising a non-volatile storage medium configured to store data, a data port configured to receive and transmit data between a host computer system and the data storage device, and a controller. The controller is configured to receive, via the data port, a notification activation, and receive, via the data port, a command data structure comprising a command for the data storage device to perform an operation. The controller is further configured to in response to receiving the command data structure, perform the operation, the operation being defined by an in-progress state and a completed state, and in response to determining that the operation is in the completed state and in response to determining the notification activation, transmit, via the data port, a response data structure comprising an indication that the operation is in the completed state.

In some embodiments, the command data structure comprises the notification activation. In some embodiments, determining the notification activation comprises determining the value of a data structure field associated with the notification activation. In some embodiments, the notification activation comprises an indication of one or more activated operation types.

In some embodiments, the command data structure is associated with an operation type, and determining the notification activation comprises determining that the activated operation types comprise the operation type.

In some embodiments, the controller is further configured to in response to receiving a notification activation, set a notification activation variable, and in response to receiving a notification deactivation, clear a notification activation variable.

In some embodiments, determining the notification activation comprises determining that the notification activation variable is set. In some embodiments, the notification activation comprises an indication of a post operation action.

In some embodiments, the controller is further configured to in response to determining that the operation is in the completed state and in response to determining the notification activation, perform the post operation action. In some embodiments, the post operation action comprises transitioning the device to a low power state.

In some embodiments, the controller is further configured to in response to determining that the operation has reached a progress level and in response to the notification activation, transmit, via the data port, a response data structure comprising an indication that the operation has reached the progress level. In some embodiments, the notification activation comprises an indication of the progress level.

In some embodiments, the controller is further configured to in response to determining that the operation is in an error state, and in response to the notification activation, transmit, via the data port, a response data structure comprising an indication that the operation is in an error state.

In some embodiments, the notification activation comprises an error notification activation, and the controller is further configured to in response to determining that the operation is in an error state, and in response to the error notification activation, transmit, via the data port, a response data structure comprising an indication that the operation is in an error state.

In some embodiments, the notification activation is located in a header of the command data structure. In some embodiments, the indication that the operation is in the completed state is located in a header of the response data structure.

In some embodiments, the command data structure is compatible with a version of the JEDEC Integrated UFS Specification. In some embodiments, the command data structure comprises a UFS Protocol Information Unit data structure.

Disclosed herein is a method for providing status information from a data storage device. The data storage device comprises a non-volatile storage medium configured to store data, and a data port configured to receive and transmit data between a host computer system and the data storage device. The method comprises receiving, via the data port, a notification activation, and receiving, via the data port, a command data structure comprising a command for the data storage device to perform an operation. The method further comprises, in response to receiving the command data structure, performing the operation, the operation being defined by an in-progress state and a completed state, and in response to determining that the operation is in the completed state and in response to determining the notification activation, transmitting, via the data port, a response data structure comprising an indication that the operation is in the completed state.

Disclosed herein is a data storage device comprising means to store data, and means to receive and transmit data between a host computer system and the data storage device. The data storage device further comprises means to receive a notification activation, and receive a command data structure comprising a command for the data storage device to perform an operation. The data storage device further comprises means to, in response to receiving the command data structure, perform the operation, the operation being defined by an in-progress state and a completed state, and in response to determining that the operation is in the completed state and in response to determining the notification activation, transmit a response data structure comprising an indication that the operation is in the completed state.

BRIEF DESCRIPTION OF DRAWINGS

One or more implementations of the invention will now be described with reference to the accompanying drawings, in which.

DESCRIPTION OF EMBODIMENTS

Data storage devices described herein provide an improved solution for providing a host computer system status information determined by the data storage device, or a component or sensor associated with the data storage device.

It is an advantage of the described embodiments that communication overhead, over the communication interface between the host computer system and the DSD, may be reduced in the provision of the status information to the host computer system.

Figure 1:
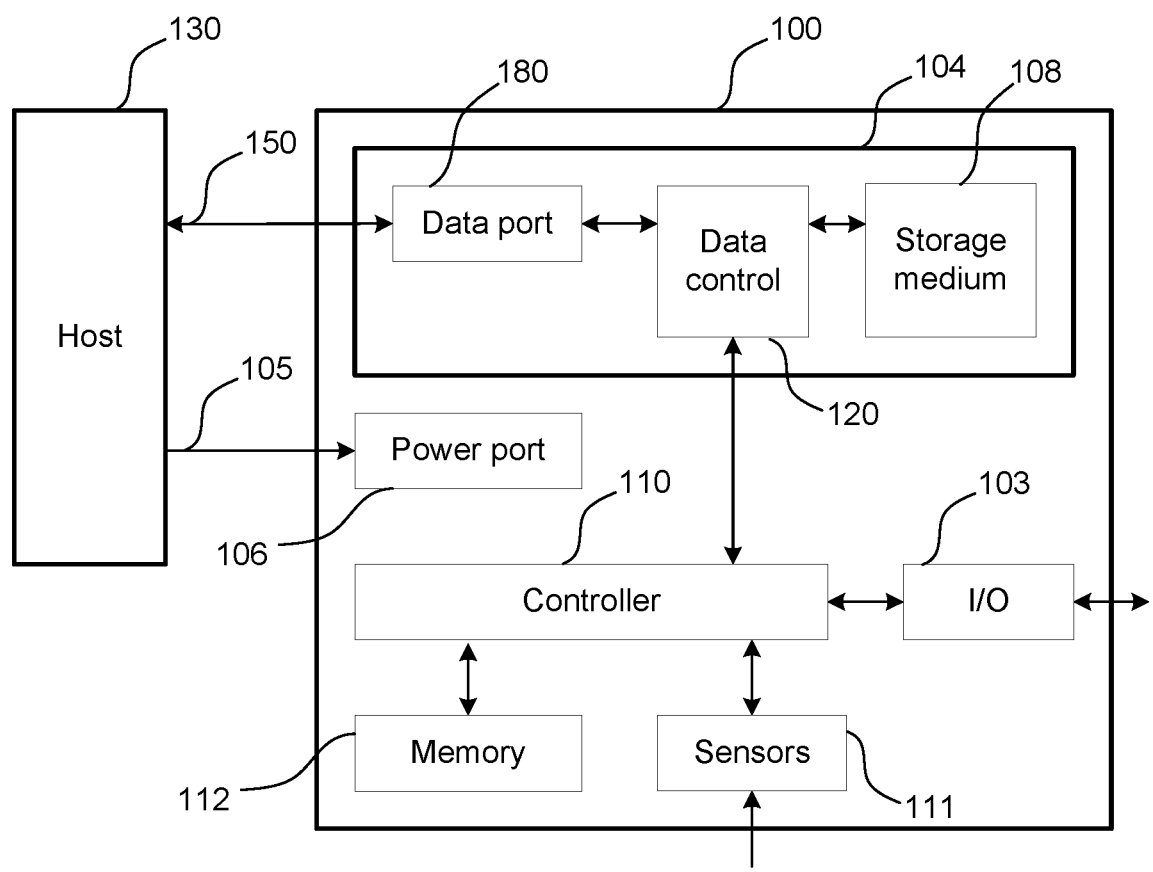
FIG. 1 illustrates a data storage device in communication with a host computer system, according to an embodiment.

FIG. 1—Data Storage Device

FIG. 1 illustrates a data storage device (DSD) 100 (hereinafter 'device 100') and a host computer system 130, according to an embodiment. The device 100 is configured to provide data storage functionality to the host computer system 130 (hereinafter 'the host 130'). The device 100 comprises a data path 104 and a controller 110. The data path 104 comprises a data port 180 configured to receive data from the host computer system 130 and configured to transmit data from the device 100 to the host 130.

Storage Medium

The device 100 further comprises a storage medium 108 to provide data storage functionality to the host 130. The storage medium 108 may also store data to be utilised by the device 100. The data stored in data store 108 may include one or more blocks of data organized into files, for example including images, documents, videos, etc., according to a particular file system operable by the host 130. The storage medium 108 is non-transitory so as to retain the stored data irrespective of whether the medium 108 is powered. The medium 108 may comprise flash memory, which may be in the form of secure digital (SD) memory or iNAND® embedded flash memory. The medium 108 may comprise a hard disk drive (HDD) with a rotating magnetic disk or a solid state drive (SSD) and its variations like SLC (Single Level Cell), eMLC (Enterprise Multi Level Cell), MLC (Multi Level Cell), TLC (Triple Level Cell), and 5LC (5uadruple Level Cell), and combinations of the above such as SSHD. Any other type of non-volatile storage media may also be used, including emerging non-volatile memory such as Program in Place or Storage Class Memory (SCM), such as ReRam, PCM, and MRAM. Further, the storage medium 108 may be a block data storage device, such that the data is written in blocks to the storage medium 108 and read in blocks from the storage medium 108.

Interfaces

Data interface 150 is configured to transmit data to and from the data port 180 and the host 130. The data interface 150 may comprise a wired interface, a wireless interface, a packet switched network, a memory buffer, a memory space that is accessible by the host and the device, any combination of these means, or another means of conveying data between the host and the device. Data transmitted over the data interface 150 may comprise commands, command responses, status information, data, user data or other digital information. The host 130 may comprises a device driver which is configured to communicate with the device 100 over data interface 150.

The host 130 may further be configured to provide power to the device 100 over power interface 105 to power port 180. The power port 106 and the data port 180 may be implemented collectively as, for example, some form of USB port (e.g., USB-A, USB-8, USB-C, mini-USB, micro-USB, etc.), a Thunderbolt port, a Power over Ethernet (PoE) port, or a similar port. The device 100 may receive power from a source other than the host 130.

Data Control

The device 100 further comprises a data control unit 120. The data control unit 120 is configured to perform read operations to read data from the storage medium 108 and provide data to the host 130 via the data port 180, or to the controller 110 for use by the controller 110. The data control unit 120 is further configured to perform write operations to write data, received from the host 130 via the data port 180, to the storage medium 108. The data control unit 120 may further write data, received from the controller 110, to the storage medium 108. In some embodiments, the data control unit 120 may process the data before writing data to the storage medium.

In some embodiments, the data control unit 120 includes a cryptography engine configured to receive, interpret and execute commands received from host 130 according to a predetermined command set, such as for example the standard Advanced Technology Attachment (ATA) or serial ATA (SATA) and/or ATA Packet Interface (ATAPI) command set, which is available from Technical Committee T13 noting that identical functionalities can be implemented within Trusted Computing Group (TCG) Opal, Small Computer System Interface (SCSI) and other proprietary architectures.

The cryptography engine may be connected between the data port 180 and the storage medium 108 and be configured to use a cryptographic key to encrypt data to be stored on the storage medium 108, and to decrypt the encrypted data stored on the storage medium 108 in response to a request from the host 130. The controller 110 causes the cryptography engine 107 to control a cryptographic state of the data stored in the storage medium 108 (i.e., encrypted or plain). In one mode of operation, the unencrypted data may pass through the data path 104 to the host 130 via the data port 180.

Controller

The device 100 further comprises a controller 110. The controller 110 may be comprised of one or more processors, microprocessors, microcontrollers or controlling circuitry. The controller 110 is configured to execute program code stored within the system memory 112 to issue commands for controlling the operation of the device 100. Accordingly, actions performed by the device 100 may be considered to be actions performed by the controller 110. Similarly, decisions and determinations made by the device 100 may be considered to be decisions and determinations made by the controller 110.

The system memory 112 may store device specific data, such as a unique identifier of the device 100. The system memory 112 may further store configuration information which defines the function of the device 100. The device 100 may receive configuration information from the host 130, and store the configuration information in the system memory 112.

The function of the controller 110 includes, but is not limited to, controlling data transmission through data path 104, and responding to commands receive from the host 130, as described herein below.

IO Interface

The device 100 may include an input/output (TO) interface 103. The IO interface 103 may include one or more input components configured to accept an input from a user. For example, the input components may include a set of buttons or a keypad, or a similar arrangement of mechanical components that collectively enable the selection of digits or characters for entering into the device 100. The input components may also include one or more communications devices, such as a wireless modem, configured to receive and transmit data wirelessly via the transmission of an electronic message in a predetermined form.

The IO interface 103 may include one or more output components configured to indicate information to a user. For example, the output components may include a speaker, configured to emit audible signals, one or more visual indicators, such as a light or a display, configured to emit visual signals.

In one embodiment, the visual indicators include at least one data access state indicator configured provide a user with an indication of the data access state of the device 100. The DA state indicator visually displays the data access state to a user.

Sensors

The device 100 may include a sensor component 111 configured to receive sensor information from one or more sensors within the device 100 or in communication with the device 100. The sensor component 111 may be configured to receive sensor information from an ambient temperature sensor, a surface temperature sensor configured to determine a surface temperature associated with the enclosure of the device 100, a thermal junction sensor, a power rate consumption sensor, an accelerometer, or another sensor.

DSD Enclosure

The device 100 may include an enclosure configured to physically house the components of the device 100. The enclosure may formed from a rigid, or semi-rigid, material with particular properties (e.g., electrical resistance and impact strength) suited to protecting the internal components of device 100. For example, the material of the enclosure may include a polycarbonate (PC), an acrylonitrile butadiene styrene (ABS), an acrylic, a thermoplastic polyester, a metal, or a combination of any of these.

Power

The power interface 105 between the host 130 and the device 100 supplies power from the host 130 to the power port 106 of the device 100. In one embodiment, the power interface 105 comprises a USB interface which is configured to supply typically 5 V at 500 mA or higher currents. In one embodiment, the power interface 105 comprises a wireless charging interface. In one embodiment, in response to the device 100 being operably coupled to host 130 via interface 105, the device 100 consumes power from the host 130 to operate the electronic circuitry of the device 100.

Figure 2:
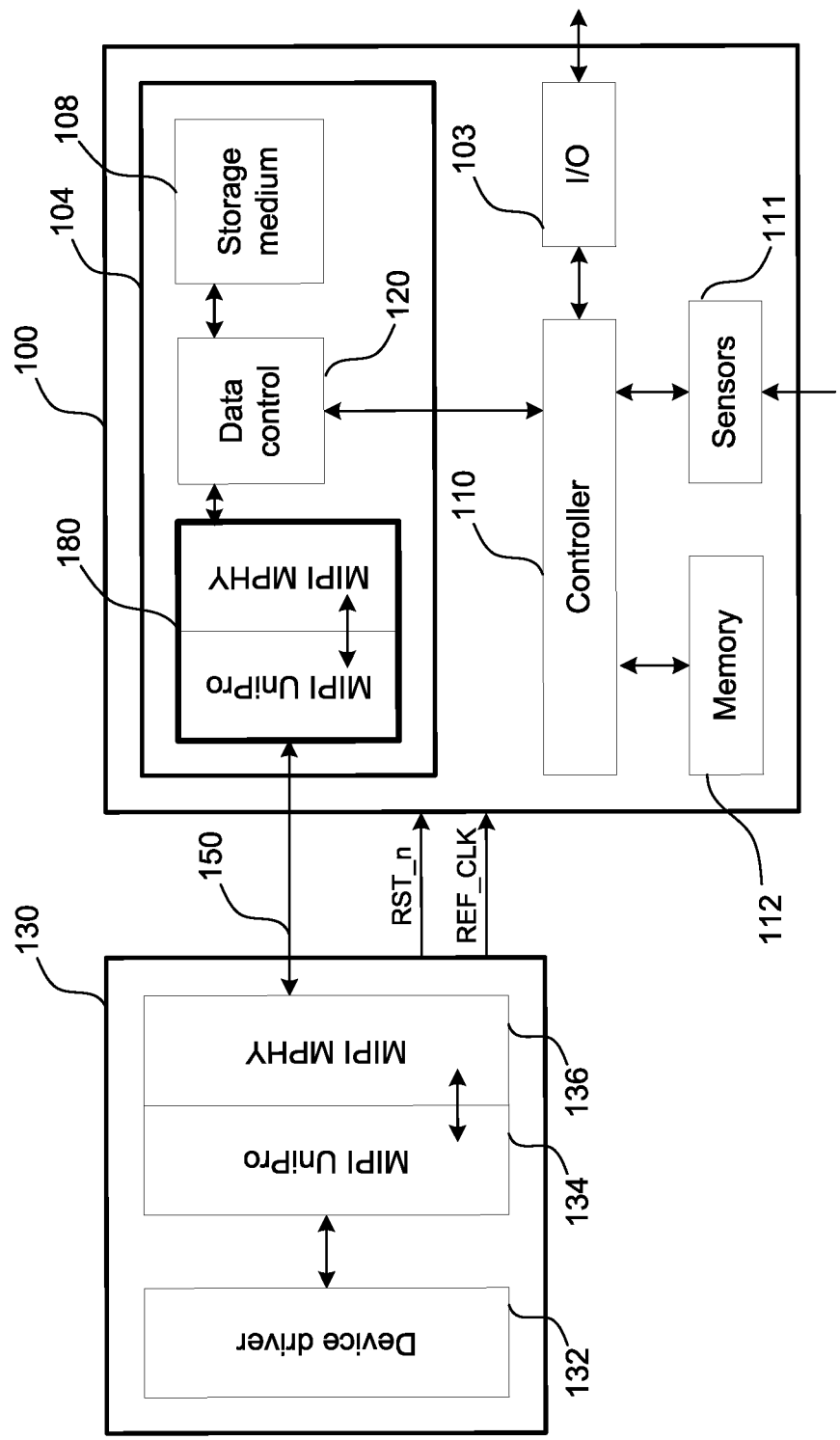
FIG. 2 illustrates additional internal components of the data storage device and the host computer system of FIG. 1, according to an embodiment.

FIG. 2—Unified Flash Storage

FIG. 2 illustrates a data storage device (DSD) 100 and a host computer system 130, according to another embodiment. In the embodiment illustrated in FIG. 2, the device 100 is configured to communicate with the host 130 according to the Universal Flash Storage (UFS) communication protocol, as defined by the Joint Electron Device Engineering Council (JEDEC) Solid State Technology Association. In particular the device 100 and the host communication according to the JEDEC UFS protocol, version 4.0.

In the embodiment illustrated in FIG. 2, the data interface 150 comprises a Unified Protocol (UniPro) interface. UniPro is a high-speed interface technology which may be used to interconnect integrated circuits. The data interface 150 may comprise a plurality of wires or connections. The data interface 150 may form a Mobile Industry Processor Interface physical layer (MIPI M-PHY®) over which the host 130 may communicate with the device 100 via a Mobile Industry Processor Interface Unified Protocol (MIPI UniPro®) protocol stack, which includes the UFS Transport Protocol (UTP) layer.

The host 130 comprises a device driver 134 which the host uses to control the functionality of the device 100. The device driver 134 interfaces to the device 100 via the host side MIPI UniPro® protocol stack 134 and the MIPI M-PHY® layer 136. On the device 100 side, the data port 180 comprises a corresponding MIPI UniPro® protocol stack and a MIPI M-PHY® layer, via which the data control unit 120 may interface with the host 130.

Data Structures

The host 130 and the device 100 communicate via the transmission of data structures over the data interface 150. In one embodiment, a data structure comprises a sequence of digital.

UFS UPIU Data Structures

In one embodiment, the command data structures transmitted by the host computer system 130, and the response data structures transmitted by the device 100 are compatible with one or more JEDEC UFS communication standards. In one embodiment, the command data structures transmitted by the host computer system 130, and the response data structures transmitted by the device 100 are compatible with the JEDEC Integrated UFS 4.0 communication standard.

In accordance with the JEDEC Integrated UFS 4.0 communication standard, UFS Transport Protocol Transactions consist of data structures called UFS Protocol Information Units (UPIUs) that travel between a host and a device on the UniPro bus. A UPIU transaction is initiated by an Initiator device and is responded to by a Target device, in the form of a Request-Response operation. The Initiator device starts the sequence of transactions by sending a request to a Target device. The Target device will then response with a series of transactions that eventually end in a response transaction.

With reference to the terminology used within the JEDEC UFS protocol specification, the host 130 may be referred to as the Initiator, and the device 100 may be referred to as the Target.

In accordance with the JEDEC Integrated UFS 4.0 communication standard, UFS UPIUs comprise a single basic header segment, transaction specific fields, possible one or more extended header segments and zero or more data segments.

Figure 3:
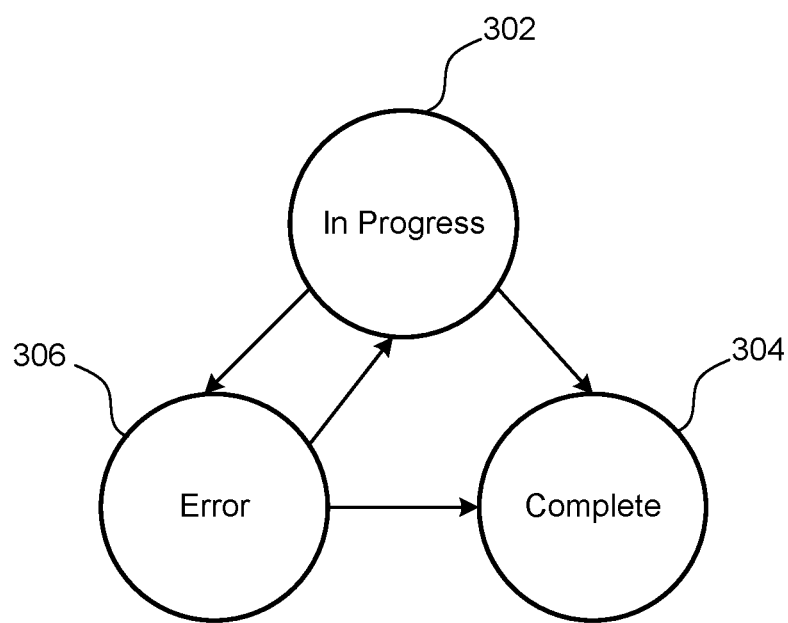
FIG. 3 illustrates the states of an operation performed by the device, according to an embodiment.

FIG. 3—Operation States

A host 130 may instruct the device 100 to perform an operation. The device 100 may perform the operation internally within the device. In some embodiments, the device 100 may cause an associated component, which may be external to the device, to perform the operation.

FIG. 3 illustrates the states of an operation performed by device 100, according to an embodiment. When the device 100 starts to perform an operation, the operation is in the 'in progress' state 302. The operation remains in the 'in progress' state 302 until the operation has been completed by the device, at which point, the operation transitions to the 'completed state' 304. If the device 100 determines that an error has occurred during the performance of the operation, the operation may transition to an 'error state' 306. In some embodiments, it may be possible to resolve the error that occurred during the performance of the operation. Accordingly, it may be possible for the operation to transition to the 'completed state' 304 or back to the 'in progress state' 302 from the error state '306'.

Determining Operation Completion

It may be advantageous for the host 130 to be able to determine when an operation, that is being performed by the device 100, has completed. For example, a host may wish to determine that an operation that is being performed by the device has completed so that the host can proceed with a subsequent operation, or so that the host can determine when the device is available to perform a subsequent operation, or so that the host can be assured that the operation has been completed.

Similarly, it may be advantageous for the host to determine if an operation being performed on the device enters an error state. Furthermore, it may be advantageous for the host to determine how an operation being performed on the device is progressing.

In some embodiments, the status of operations that are performed by the device 100, or performed under the control of the device, may be not be apparent to the host 130. This may be because the operations are being performed internally within the device, or as a background process of the device. Furthermore, the host may not be may aware of the completion of an operation performed by the device. This may be because the communication standard being implemented by the host and the device does not define a communication data structure, from the device to the host, that communicates the completion of the operation.

Figure 4:
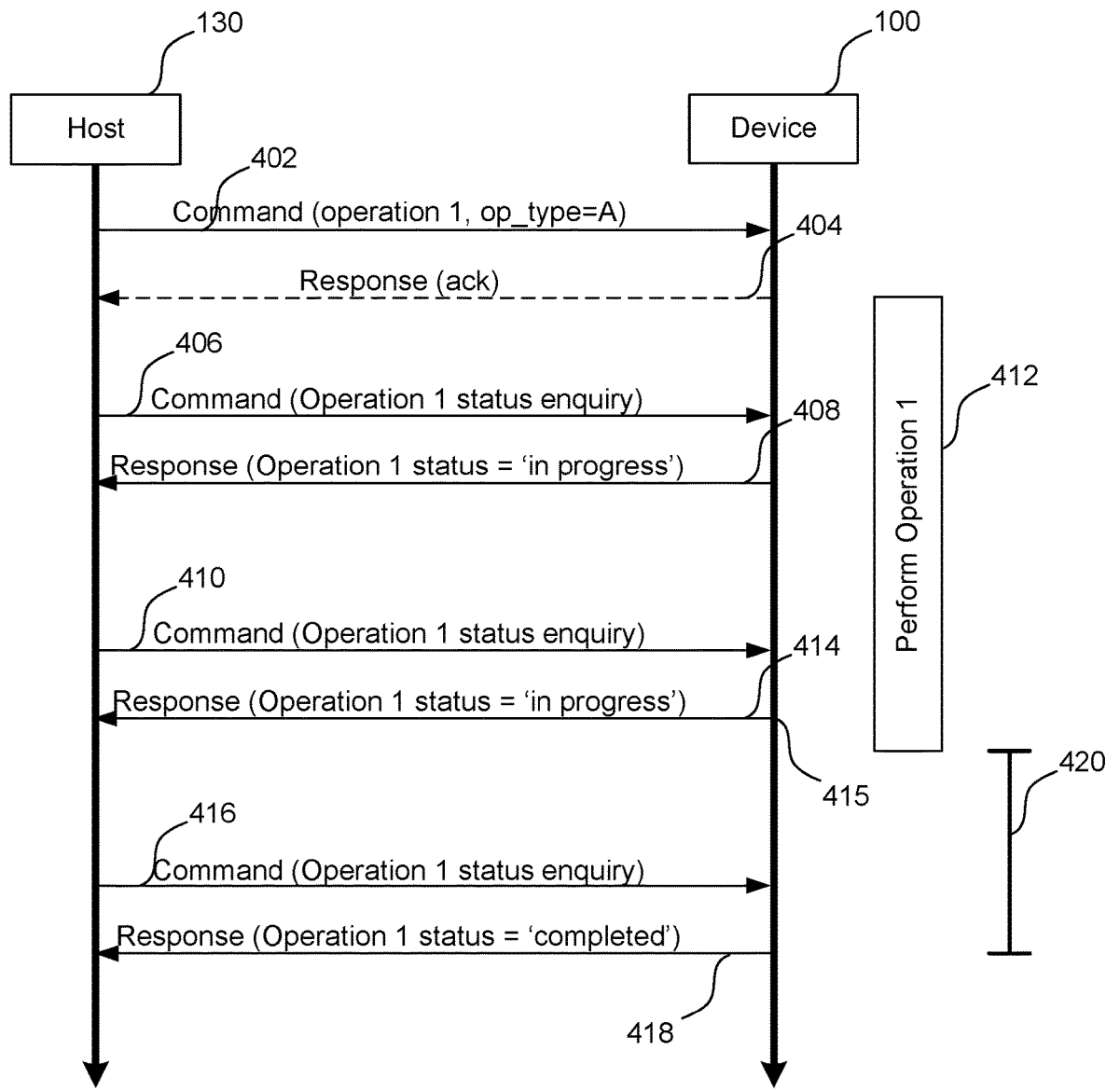
FIG. 4 is a message flow diagram illustrating a transmission of messages to and from the host and the device, according to an example.

FIG. 4—A Method of Determining Operation Completion

FIG. 4 is a message flow diagram illustrating a transmission of messages to and from the host 130 and the device 100, according to an example. FIG. 4, and other message flow diagrams incorporated herein, provide an indicative representation of the ordered transmission of communications between the host and the device over data interface 150. Communications may be in the form of data structures, and any data structures may be transmitted across data interface 150 as contiguous transmission, or as a set of discrete transmissions which may be collated by the receiver. Communications transmitted earlier in time are represented at the top of the message flow diagram, with the transmission of subsequent data structures depicted under earlier transmissions. It is not intended that FIG. 4, and other message flow diagrams incorporated herein, be drawn to scale. Furthermore, it is understood that FIG. 4, and other message flow diagrams incorporated herein, may not represent the entirety of communications occurring between the host and the device, and that additional communications may be transmitted between the communications represented in the incorporated message flow diagrams.

With reference to the message flow diagram in FIG. 4, the host 130 transmits a command data structure 402 to the device 100. The command data structure 402 comprises a command for the device to perform an operation, namely operation 1. The command data structure 402 further comprises an indication of an operation type, namely operation type A.

Operation 1 defines the execution of a function by the device 100. In one example, operation 1 may comprise a Small Computer System Interface (SCSI) command. In another example, operation 1 may comprise an operation to obtain data from the device, or a component associated with the device. In another example, operation 1 may comprise a read, write, erase, purge, or preparation operation to be performed on the storage medium 108.

In response to receiving command data structure 402, the device 100 acknowledges receipt of command data structure 402 by transmitting response data structure 404. The transmission of response data structure 404 may be optional in some embodiments. In some embodiments, the device is not configured to transmit the response data structure 404 to acknowledge receipt of command data structure 402. In such embodiments, the host may assume that the device has fully received, and will action command data structure 402.

Additionally, in response to receiving command data structure 402, the device performs operation 1, which is indicated by operation 412 in FIG. 4.

While the device 100 performs operation 412, the host 130 transmits command data structure 406 to enquiry about the completion status of operation 412. As the device has not yet completed operation 412, the device transmits response data structure 408, which includes an indication that the operation 412 not yet complete, and is still in progress.

Similarly, still while the device 100 is performing operation 412, the host 130 again enquires as to the completion status of operation 412 by transmitting command data structure 410, and the device 100 indicates the in-progress status of operation 412 via response data structure 414.

At time 415, the device 100 completes operation 412. Time 415 is soon after, but unrelated to, the receipt of command data structure 410 and the transmission of response data structure. At some time after the completion of operation 412, the host 130 once again enquires as to the completion status of operation 412 by transmitting command data structure 416. This time, the device 100 indicates to the host that operation 412 has completed, by the transmission of response data structure 418.

Notably, for the host 130 to determine that operation 412 has completed, the host and the device, collectively, transmitted six data structures across data interface 150 (406, 408, 410, 414, 416 and 418). In another example, the host 130 may transmit only one command data structure to enquire as to the status of an operation, and in response, if the operation is complete, the device may transmit only one response data structure indicating the operation's complete status. Such an example would comprise the transmission of two data structures across data interface 150.

In some embodiments, it may be desirable for the host 130 to determine, promptly, the completion of an operation performed on the device 100. A prompt notification of the completion of an operation may be desirable to enable the host to proceed with subsequent operations on the host, the device, or elsewhere.

The example illustrated in FIG. 4 does not assure a prompt notification of the completion of an operation to the host. With reference to the example illustrated in FIG. 4, time period 420 indicates a time period between when the device completed operation 412, at time 415, and when the host 130 receives response data structure 418 comprising the indication that operation 412 had completed.

The time at which the host determines the completion of operation 412 depends upon when the host transmits a status enquiry command to the device 100. If the host 130 does not transmit a status enquiry command for a long period, for example due to the occupation of the host with other tasks, or the desire of the host not to overload data interface 150, the host may not learn of the completion of operation 412 promptly.

In an embodiment in which the host 130 and the device 100 communicate in as defined within the JEDEC Integrated UFS 4.0 communication standard, to determine the status of an operation being performed on the device, the host transmits a data structure to the device, wherein the data structure includes an enquiry as to the status of the operation. The JEDEC Integrated UFS 4.0 communication standard does not define a communication method which would enable the device (e.g. the Target) to communicate the completion of the operation to the host (e.g. the Initiator), in response to the operation reaching a completed status.

Host Activated Notification of Operation Completion

Described herein are embodiments for enabling a host-activated notification method, whereby the host instructs the device to notify the host upon the completion of an operation, and the device provides a completion notification to the host in response to the completion of an operation performed by the device.

Accordingly, embodiments described herein ameliorate the communication overhead, over data interface 150, associated with the host enquiring as to the status of an operation performed by the device. Furthermore, embodiments described herein ameliorate the processing overhead of the host, associated with the host enquiring as to the status of an operation performed by the device. Additional advantages of the methods described herein will be apparent in light of embodiments described herein.

In a command data structure transmitted by the host to the device, the host embeds a 'notification activation' which may be interpreted by the device as a request to notify the host of the completion of an operation performed by the device or a component associated with the device. In response to the notification activation, the device determines the completion status of the operation, and transmits a notification to the host of the completion of the operation.

In one embodiment, the one or more bits indicating the notification activation are located within data structure fields that are defined, by a communication standard, as being reserved fields. Although the communication standard may suggest or require that the contents of the reserved fields are set to a specific value (e.g. set to all zeros), data structures that comprise the notification activation within the reserved data structure fields, are considered to be compatible with the relevant communication standard.

In some embodiments, the notification activation indicates the activation of completion notifications for a specific instance of an operation. In other embodiments, the notification activation may indicate the activation of completion notifications for all instances of one or more specific operation types, or all instances of all operation types.

Figure 5:
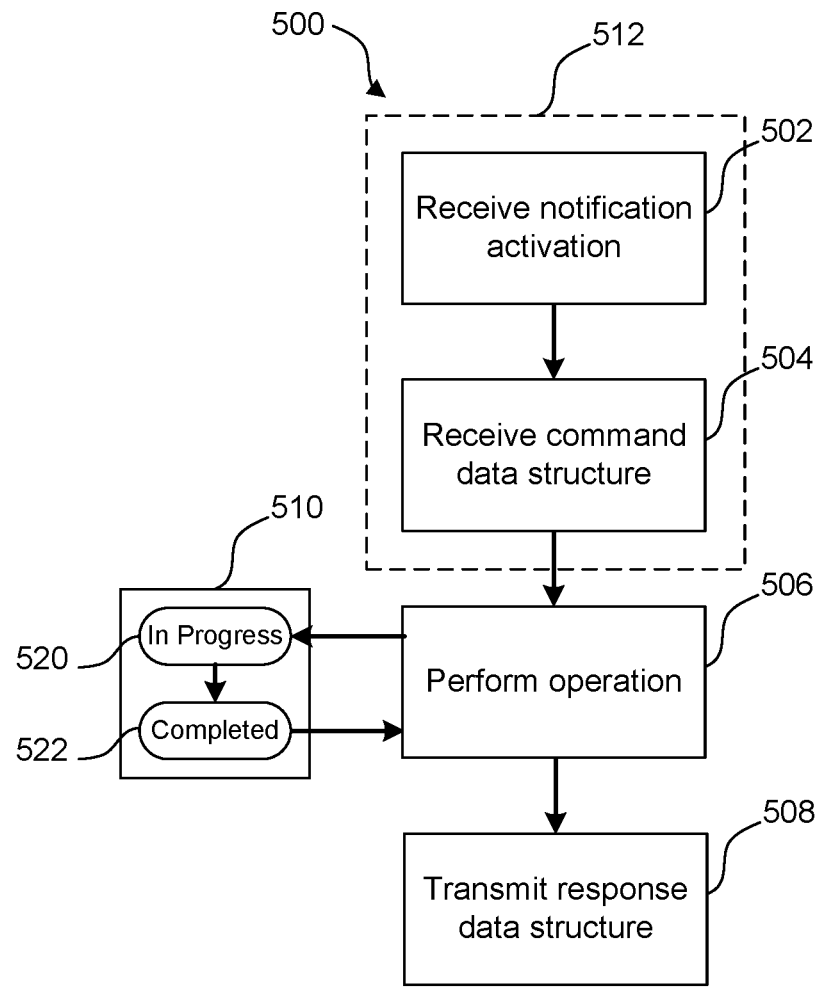
FIG. 5 is a flowchart illustrating a method for notifying the completion of an operation by a data storage device, according to an embodiment.

The operation type of an operation may be indicated within a field of a command data structure. For example, the operation type may be indicated within the UIPU header of a Command UIPU data structure FIG. 5—An Improved Method FIG. 5 is a flowchart illustrating a method 500 for notifying the completion of an operation by a data storage device, according to an embodiment. Method 500 is performed by the controller 110 of the device 100.

In step 502, the device 100 receives, via data port 180, a notification activation, from the host 130 via the data interface 150. The notification activation comprises an indication for the device to activate notifications for the completion of an operation. The notification activation may further comprise an indication of one or more activated operation types, which indicates the one or more operation types for which the device is to activate notifications.

In step 504, the device 100 receives, via data port 180, a command data structure from the host 130 via the data interface 150. The command data structure may comprise an indication of an operation type associated with the command data structure.

In one embodiment, the command data structure comprises the notification activation. In such embodiments, steps 502 and 504 may be combined such that the device receives the command data structure and the notification activation in a single step 512.

In step 506, in response to receiving the command data structure in step 504, the device 100 performs an operation 510. The operation 510 is defined by an in-progress state 520 and a completed state 522.

In step 508, in response to determining that the operation 512 is in the completed state 522, and in response to the notification activation received in step 502, the device 100 transmits, via the data port 180, a response data structure. The response data structure comprises an indication that the operation 510 is in the completed state. In some embodiments, the response data structure further comprises status information indicative of the status of the device, status of the operation, or status of a component or sensor associated with the device.

Following step 508, the device 100 may receive further notification activations in step 502, further command data structures in step 504, or further command data structures that comprise notification activations, in step 512. In response to receiving each command data structure, the device 100 performs an operation, in step 506, and if notification has been activated for the operation, in step 502, the device transmits a response data structure in step 508, wherein the response data structure comprises a notification that the operation is in the completed state.

Advantageously, in response to instructing the device 100 to perform an operation, by transmitting a command data structure to the device 100, the host 130 receives a notification of the completion of the operation without having to transmit one or more status enquiry commands to the device. This advantageously arrangement is activated by the host through the transmission of a data structure that comprises a notification activation.

Figure 6:
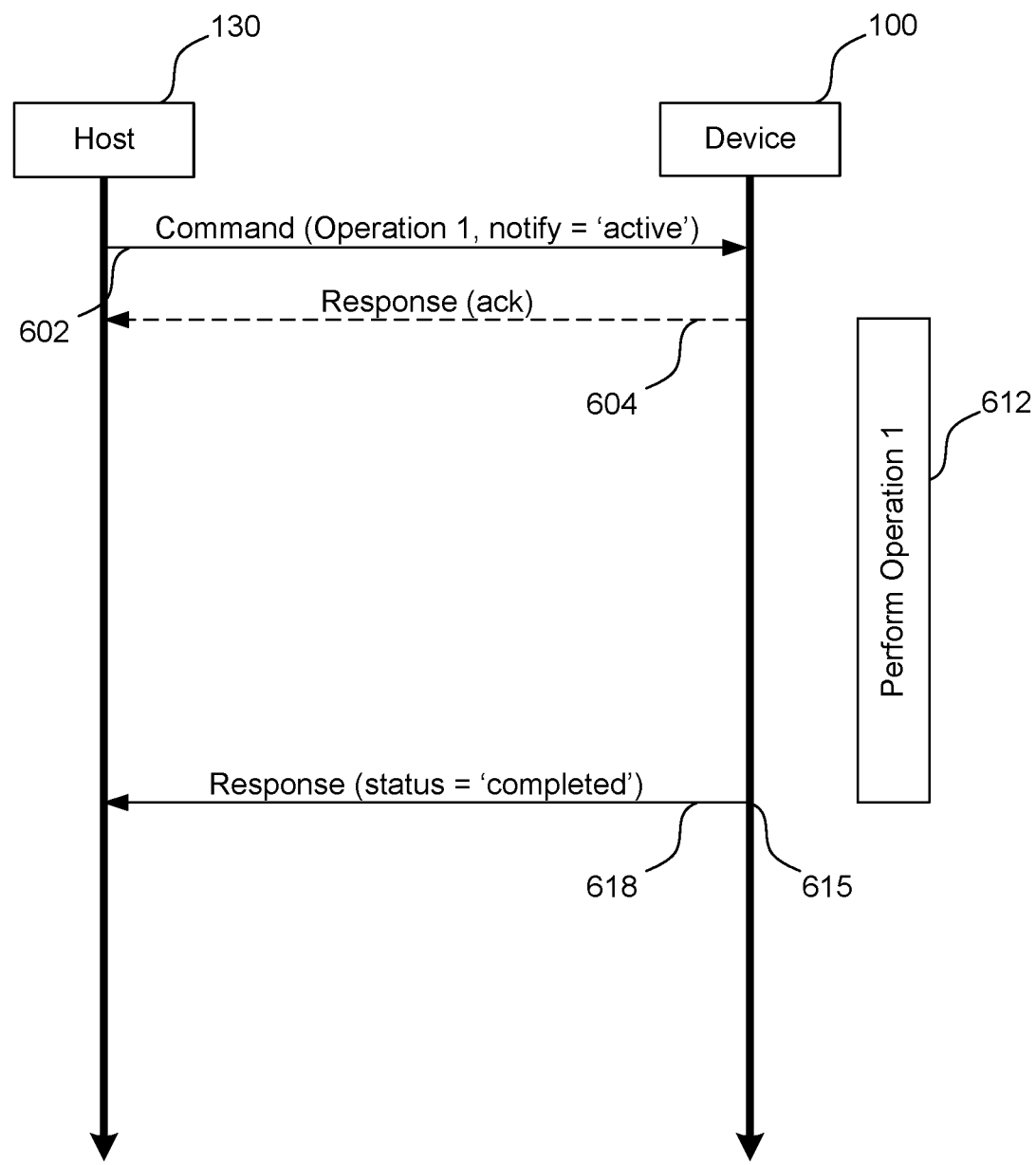
FIG. 6 is a message flow diagram illustrating a transmission of messages, between the host and the device, to effect the completion of operation A, according to an embodiment.

FIG. 6—Notification Example

FIG. 6 is a message flow diagram illustrating a transmission of messages, between the host 130 and the device 100, to effect the completion of operation 1, as performed on the device, according to an embodiment. In the example illustrated in FIG. 6, the host activates notification, causing the device to notify the host of the completion of operation 1.

The functionality the device 100 in the example of FIG. 6 is in accordance with method 500. Accordingly, the functionality of the host 130 and the device in FIG. 6 may be contrasted with the functionality of the host and the device in the example illustrated in FIG. 4, in which the device does not function in accordance with method 500. Similarly, the messages transmitted across data interface 150 in FIG. 6 may be contrasted with the messages transmitted across data interface 150 in FIG. 4.

The command data structure 602 comprises a Command UIPU data structure which comprises a command for the device 100 to perform an operation. The command data structure 602 comprises an indication of an operation to be performed by the device, namely operation 1. In one embodiment, the command included in command data structure 602 is the same as the command included in command data structure 402.

The command data structure 602 further comprises a notification activation, which instructs the device to transmit a notification to the host when the operation 1 is in a completed state.

In response to receiving command data structure 602, the device 100 acknowledges receipt of command data structure 602 by transmitting response data structure 604. In some embodiments, the device is not configured to transmit the response data structure 604 in response to receiving command data structure 602. In such embodiments, the host may assume that the device has fully received, and will action command data structure 602.

Additionally, in response to receiving command data structure 602, the device performs operation 1, which is indicated by 612 in FIG. 6. While the device is performing operation 1 612, operation 1 612 is considered to be in an in-progress state.

At time 615, the device 100 completes operation 1 612. Accordingly, at time 615, operation 1 612 enters a completed state. In response to operation 1 612 reaching a completed state, and in response to the notification activation included in command data structure 602, soon after, or immediately after, time 615, the device 100 transmits a response data structure 618 to the host. The response data structure 618 comprises an indication that operation 612 has been completed (i.e. is in the completed state).

Advantageously, the host 130 receives the response data structure 618 soon after, or immediately after, the time at which the operation 1 completes. Accordingly, there is minimal delay between when the operation 1 completes, and when the host determines that the operation 1 has completed.

Additionally, in the example of FIG. 6, the host 130 receives a notification, in the form of response data structure 618, that the operation 1 612 has completed, without the host 130 having to enquiry as to the completion status of operation 1. In some embodiments, as the host 130 does not need to enquire as to the completion status of operation 1, by transmitting a status enquiry data structure to the device 100, the host may perform other activities, or conserve power, while waiting for operation 1 to complete.

Figures 7, 8:
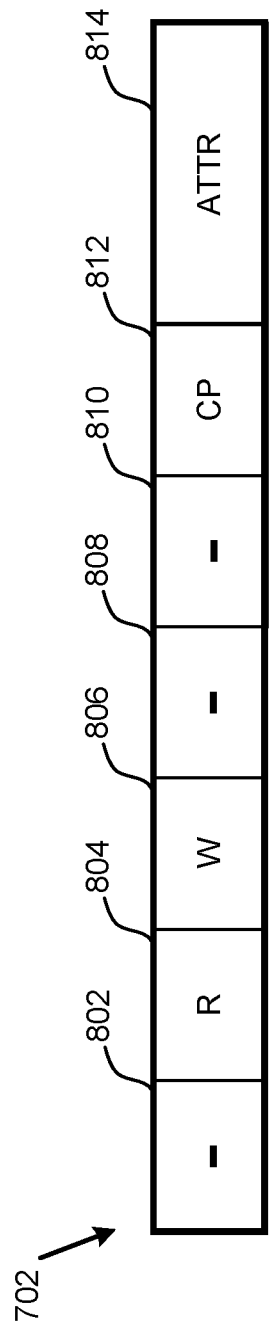
FIG. 7 illustrates the fields of a UPIU header segment, according to an embodiment.
FIG. 8 illustrates the flag field of the UPIU header illustrated in FIG. 5, according to an embodiment.

FIGS. 7 and 8—UPIU Header

FIG. 7 illustrates the fields of a UPIU header segment 700 in accordance with the JEDEC Integrated UFS 4.0 communication standard, according to an embodiment. The JEDEC Integrated UFS 4.0 communication standard defines a plurality of different UPIU transaction types. Transaction type field 706 may be used by the transmitter of a UPIU data structure to indicate the type of UPIU transaction to which the data structure belongs.

The UPIU header segment further comprises a flag field 702. FIG. 8 illustrates the flag field 702 of the UPIU header 700 illustrated in FIG. 7 for a Command UIPU data structure, according to an embodiment. The flag field 702 for a Command UIPU data structure comprises a read flag 804, which indicates a read data operation from the device to the host, and a write flag 806, which indicates a write data operation from the host to the device. The flag field 702 further comprises a command priority flag 812 and an attribute flag 814. The flag field 702 further comprises three reserved bits 802, 808 and 810, which are not used for the Command UIPU.

Location of Notification Activation

In one embodiment, the command data structure comprises a JEDEC USF 4.0 Command UIPU data structure. Alternatively, the command data structure may comprise a JEDEC USF 4.0 Data Out UPIU data structure. Alternatively, the command data structure may comprise any command issued by the host 130 to the device 100.

In one embodiment, the notification activation is located within one or more reserved fields of the UIPU header. For example, the host 130 may locate the notification activation in one or more of the three reserved bits 802, 808 or 810 of the flag field 720 of a UPIU header for a command data structure of type=Command.

In one embodiment, the notification activation is located with the body of the command data structure. In one embodiment, the notification activation is located within one or more reserved fields of the UIPU body.

In one embodiment, the notification activation comprises a single bit flag, which when set to '1' indicates that notification is activated, and when set to '0' indicates that notification is deactivated.

Location of Completion Indication

In one embodiment, the response data structure comprises a JEDEC USF 4.0 Response UIPU data structure. Alternatively, the command data structure may comprise a JEDEC USF 4.0 Data In UPIU data structure or a JEDEC USF 4.0 Ready To Transfer UPIU data structure. Alternatively, the command data structure may comprise any command issued by the device 100 to the host 130.

The indication that the operation is in the completed state may be referred to as the 'completion indication'. In one embodiment, the completion indication is located within one or more reserved fields of the UIPU header.

For example, the device 100 may locate the completion indication in one or more of the reserved bytes 5, or 16 to 31 of the JEDEC USF 4.0 Response UPIU data structure. In another example, the device 100 may locate the completion indication in one or more of the reserved bytes 5, 6, 7, 9 or 20 to 31 of the JEDEC USF 4.0 Data In UPIU data structure. In another example, the device 100 may locate the completion indication in one or more of the reserved bytes 5, 6, 7, 9 or 20 to 31 of the JEDEC USF 4.0 Ready To Transfer UPIU data structure.

Notification Activation Variable

In one embodiment, the device is configured to maintain one or more notification activation variables. A notification activation variable indicates whether the host has instructed the device to provide notifications that an operation is in the completed state. A device may maintain a separate notification activation variable for each operation instance, and/or each operation type that the device is configured to perform.

In response to receiving a data structure comprising a notification activation, the device is configured to set a notification activation variable. In response to receiving a data structure comprising a notification deactivation, the device is configured to clear the notification activation variable.

Figure 9:
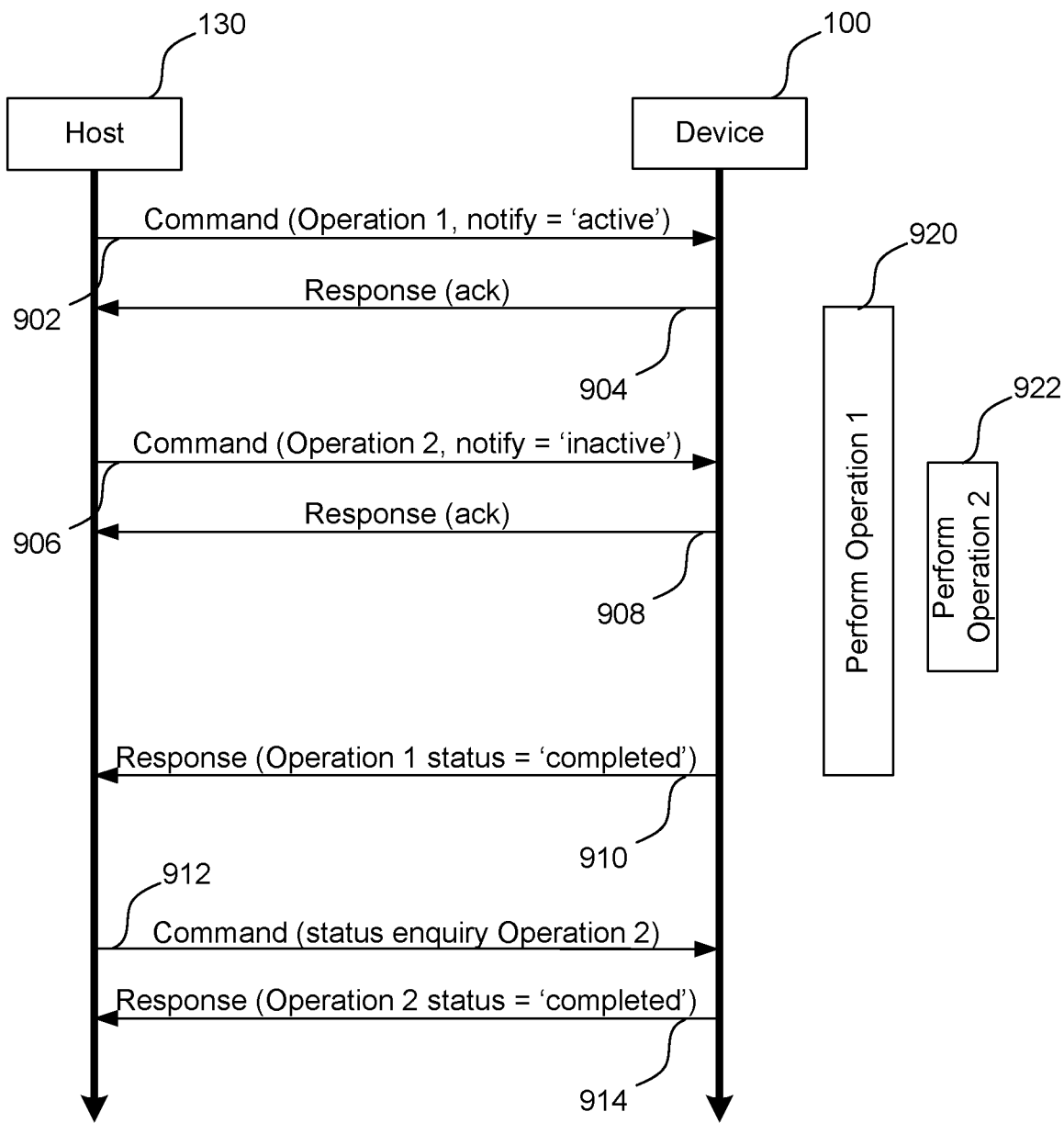
FIG. 9 is a message flow diagram illustrating a transmission of messages, between the host and the device, to effect the completion of operation A and operation B, according to an embodiment.

FIG. 9—Notification Deactivation Example

FIG. 9 is a message flow diagram illustrating a transmission of messages, between the host 130 and the device 100, to effect the completion of operation 1 and operation 2, as performed on the device, according to an embodiment. In the example illustrated in FIG. 9, the host activates notification for operation 1, causing the device to notify the host of the completion of operation 1. However, the host does not activate notification for operation 2, meaning that the device does not notify the host of the completion of operation 2.

The command data structure 902 comprises a Command UIPU data structure which comprises a command for the device 100 to perform an operation. The command data structure 902 comprises an indication of operation, namely operation 1. The command data structure 902 further comprises a notification activation, in which instructs the device to transmit a notification to the host when the operation 1 is in a completed state.

In response to receiving command data structure 902, the device 100 acknowledges receipt of command data structure 902 by transmitting response data structure 904. In some embodiments, the device is not configured to transmit the response data structure 904 in response to receiving command data structure 902.

Additionally, in response to receiving command data structure 902, the device performs operation 1, which is indicated by operation 920.

While performing operation 1 920, the device receives command data structure 906. The command data structure 906 comprises a Command UIPU data structure which comprises a command for the device 100 to perform another operation. The command data structure 906 comprises an indication of an operation, namely operation 2. The command data structure 906 further comprises a notification deactivation, in which instructs the device not to transmit a notification to the host when the operation 2 is in a completed state. The notification deactivation may comprise the notification activation flag set to its negated value.

In response to receiving command data structure 906, the device 100 acknowledges receipt of command data structure 906 by transmitting response data structure 908. Additionally, in response to receiving command data structure 906, the device performs operation 2, which is indicated by operation 922.

In response to operation 1 920 reaching a completed state, and in response to the notification activation included in command data structure 902, the device 100 transmits a response data structure 910 to the host. The response data structure 910 comprises an indication that operation 1 920 is in the completed state. In one embodiment, response data structure 910 comprises data which indicates that response data structure 910 is transmitted in response to command data structure 902. In one embodiment, response data structure 910 comprises a RESPONSE UPIU data structure, and the header of response data structure 910 comprises a Task Tag which includes an indication of command data structure 902.

In response to operation 2 922 reaching a completed state, and in response to the notification deactivation indicated by command data structure 906, the device 100 does not transmit a response data structure to the host to indicate the completion of operation B 922.

Optionally, the host may transmit a data structure 912 to the host to enquiry as to the completion status of operation 2 922. In response to receiving an enquire data structure 912, the device may transmit a response data structure 914 which indicates the completion status of operation 2 922. In one embodiment, response data structure 914 comprises a RESPONSE UPIU data structure, and the header of response data structure 914 comprises a Task Tag which includes an indication of command data structure 906.

Figure 10:
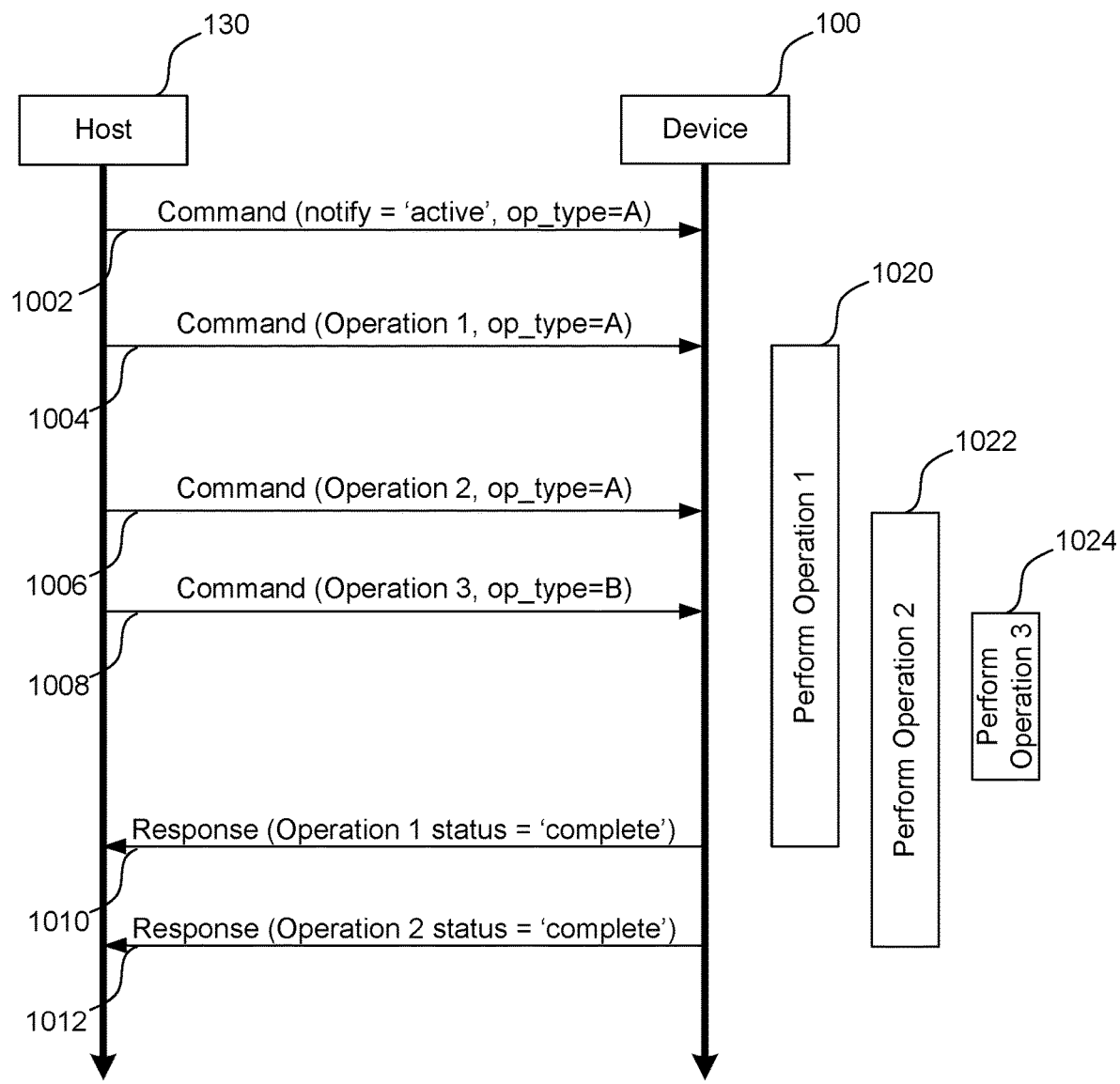
FIG. 10 is a message flow diagram illustrating a transmission of messages, between the host and the device, to effect the completion of a plurality of operations, according to an embodiment.

FIG. 10—Notification Per Type Example

FIG. 10 is a message flow diagram illustrating a transmission of messages, between the host 130 and the device 100, to effect the completion of a plurality of operations, as performed on the device, according to an embodiment.

In the example illustrated in FIG. 10, the host activates notification for all instances of one or more activated operation types, causing the device to notify the host of the completion of any operation of the activated operation types.

In one embodiment, the command data structure 1002 comprises a Command UIPU data structure which comprises a notification activation. The notification activation comprises an indication of an activated operation type, which instructs the device to transmit a notification to the host whenever an operation of the activated operation type enters a completed state. In this example, the activated operation type is operation type 'A'.

In one embodiment, a operation of operation type A may be performed by the device 100 to obfuscate or erase data stored in the storage medium 108. In another example, the activated operation type may comprise a read operation, a write operation, an erase operation, an initialisation operation, or any operation type that may be recognised and performed by the device 100.

The device 100 receives command data structure 1004, which comprises a Command UIPU data structure instructing the device to perform operation 1, which is an operation of operation type A. In response to receiving command data structure 1004, the device performs operation 1, indicated by 1020.

At a later time, device 100 receives command data structure 1006, which comprises a Command UIPU data structure instructing the device to perform operation 2, which is another operation of operation type A. In response to receiving command data structure 1006, the device performs operation 2, indicated by 1022.

At a later time, device 100 receives command data structure 1008, which comprises a Command UIPU data structure instructing the data to perform operation 3, which is an operation of operation type B. In response to receiving command data structure 1008, the device performs operation 3, indicated by 1024.

In response to operation 1 1020 reaching a completed state, and in response to the notification activation in command data structure 1002, and in response to the operation type of operation 1 1020 being the activated operation type, as indicated in command data structure 1020, the device 100 transmits a response data structure 1010 comprising an indication that operation 1 1020 is in the completed state.

In response to operation 2 1022 reaching a completed state, and in response to the notification activation in command data structure 1002, and in response to the operation type of operation 2 1022 being the activated operation type, as indicated in command data structure 1020, the device 100 transmits a response data structure 1012 comprising an indication that operation 2 1022 is in the completed state.

Notably, however, in response to operation 3 1024 reaching a completed state, and in response to the notification activation in command data structure 1002, and in response to the operation type of operation 3 1024 not being the activated operation type, as indicated in command data structure 1020, the device 100 does not transmit a response data structure comprising an indication that operation 3 1024 is in the completed state.

In one embodiment, in response to receiving each of command data structures 1002, 1004, 1006 and 1008, the device 100 transmits a response data structure to the host 130, wherein the response data structure acknowledges receipt of the respective command data structure.

In one embodiment, response data structure 1010 comprises a RESPONSE UPIU data structure, and the header of response data structure 1010 comprises a Task Tag which includes an indication of command data structure 1004. In one embodiment, response data structure 1012 comprises a RESPONSE UPIU data structure, and the header of response data structure 1012 comprises a Task Tag which includes an indication of command data structure 1006.

Figure 11:
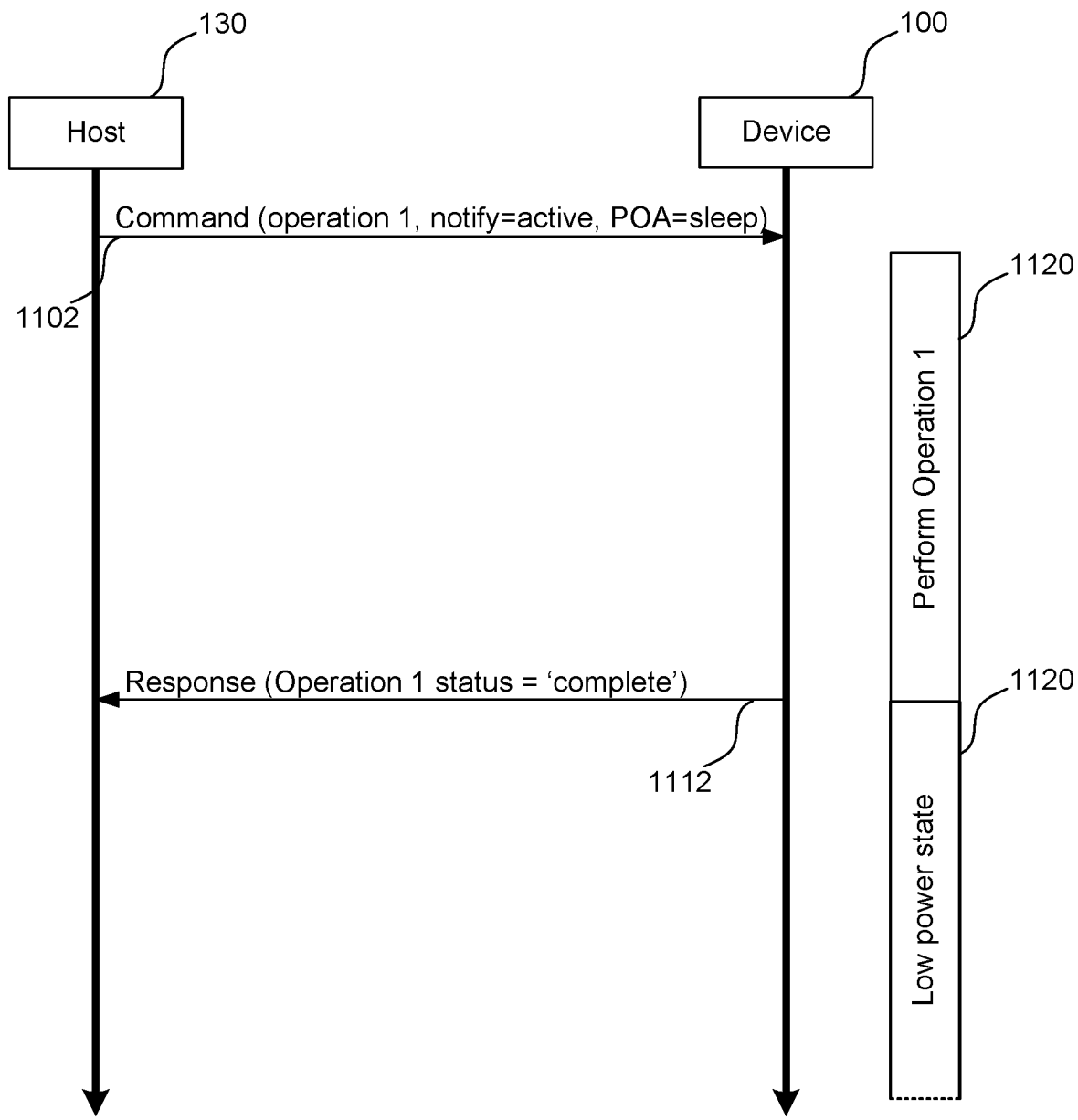
FIG. 11 is a message flow diagram illustrating a transmission of messages, between the host and the device, to effect the transition of the device to a low power state following the completion of an operation, according to an embodiment.

FIG. 11—Post Operation Action Example

In some embodiments, the notification activation comprises an indication of a post operation action, which instructs the device to perform a specified action following the completion of an operation.

FIG. 11 is a message flow diagram illustrating a transmission of messages, between the host 130 and the device 100, to effect the transition of the device to a low power state following the completion of an operation, according to an embodiment.

The device 100 receives command data structure 1102, which comprises a command for the device to perform an operation, specifically operation 1. The command data structure 1102 further comprises a notification activation and an indication of a post operation action. The post operation action instructs the device to enter a low power (sleep) state once the device has completed operation 1.

In response to receiving command data structure 1102, the device 100 performs operation 1 1120. In response to operation 1 1120 reaching the completed state, and in response to the notification activation included in command data structure 1102, the device transmits a response data structure 1112 comprising an indication that operation 1 1120 is in the completed state.

Additionally, in response to operation 1 1120 reaching the completed state, in response to the notification activation included in command data structure 1102, and in response to the post operation action included in command data structure 1102, the device 100 transitions to a low power state. The low power state may reduce the rate of power consumption by the device.

Figure 12:
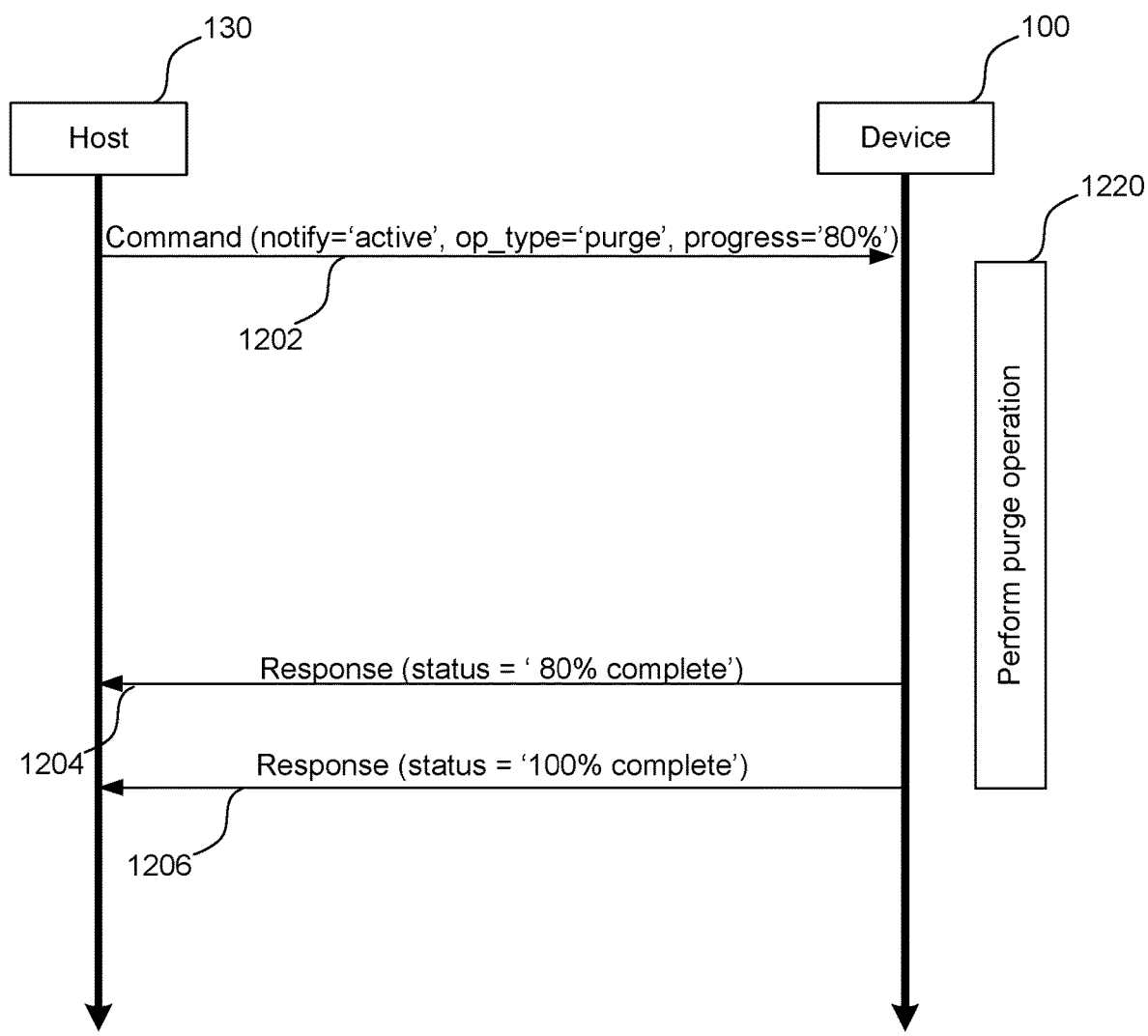
FIG. 12 is a message flow diagram illustrating a transmission of messages, between the host and the device, to effect the notification of an operation reaching a specified progress level, according to an embodiment.

FIG. 12—Progress Notification Example

In some embodiments, the notification activation comprises an indication of a progress notification, which instructs the device to transmit a notification in response to an operation reaching a specified progress level.

FIG. 12 is a message flow diagram illustrating a transmission of messages, between the host 130 and the device 100, to effect the notification of an operation reaching a specified progress level, according to an embodiment.

The device 100 receives command data structure 1202, which comprises a command for the device to perform an operation, specifically an operation of operation type 'purge'. The command data structure 1202 further comprises a notification activation. The command data structure 1202 further comprises a progress notification which comprises an indication of a progress level. In this example, the progress level is 80%. The progress notification instructs the device to transmit a response data structure indicating that the operation has reached a 80% progress level.

In response to receiving command data structure 1202, the device 100 performs the purge operation 1220. In response to operation 1220 reaching, at least, an 80% progress level, and in response to the progress notification included in command data structure 1202, the device transmits a response data structure 1204 comprising an indication that operation 1220 is, at least, 80% complete. The device may determine a progress level of an operation in terms of a quantity of the storage medium that has been operated on during the operation 1220.

Additionally, in response to operation 1220 reaching the completed state, and in response to the notification activation included in command data structure 1102, the device 100 transmits a response data structure 1206 comprising an indication that operation 1220 is in the completed state.

Error Notification

In one embodiment, the notification activation comprises an error notification activation. In response to an operation entering an error state 306, and in response to the notification activation comprising an error notification, the device 100 transmits a response data structure comprising an indication that operation is in the error state.

In one embodiment, the host does not need to transmit an error notification activation to the device in order for the device to notify the host of an operation entering the error state. In response to an operation entering an error state 306, and in response to the notification activation, the device 100 transmits a response data structure comprising an indication that operation is in the error state.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A data storage device comprising:
   a non-volatile storage medium configured to store block data for a host computer system;
   a data port configured to receive and transmit, using a data storage command set, the block data between the host computer system and the data storage device, wherein:
   command data structures are transmitted between the host computer system as initiator and the data storage device as target in request-response operations; and
   the data storage command set comprises a first command data structure, a second command data structure, and a third command data structure; and
   one or more processors configured to, alone or in combination:
   receive, via the data port, a first notification activation;
   selectively activate, responsive to the first notification activation, a completion status notification for a first operation;
   receive, via the data port, the first command data structure comprising a first command for the data storage device to perform the first operation;
   in response to receiving the first command data structure, perform the first operation, wherein operations are defined by an in-progress state and a completed state;
   in response to the activated completion status notification and determining that the first operation is in the completed state, transmit, via the data port, a first response data structure comprising an indication that the first operation is in the completed state;
   receive, via the data port, the second command data structure comprising a second command for the data storage device to perform a second operation;
   in response to receiving the second command data structure, perform the second operation;
   receive, via the data port, the third command data structure comprising a status inquiry for the second operation; and
   in response to the status inquiry, transmit, via the data port, a second response data structure comprising an indication of a state of the second operation.

2. The data storage device of claim 1, wherein the first command data structure comprises the first notification activation.

3. The data storage device of claim 1, wherein selectively activating the completion status notification for the first operation comprises determining a value of a data structure field associated with the first notification activation.

4. The data storage device of claim 1, wherein:
   the first notification activation comprises an indication of one or more activated operation types;
   the first operation includes an operation type of the one or more activated operation types; and
   the second operation does not include the one or more activated operation types.

5. The data storage device of claim 4, wherein:
   the first command data structure comprises a first operation type for the first operation;
   selectively activating the completion status notification for the first operation comprises determining that the one or more activated operation types comprise the first operation type in the first command data structure;
   the second command data structure comprises a second operation type for the second operation; and
   the one or more processors are further configured to, alone or in combination, determine, based on the second operation type, that completion status notification is inactive for the second operation.

6. The data storage device of claim 1, wherein the one or more processors are further configured to, alone or in combination:
   in response to receiving the first notification activation, set a notification activation variable; and
   in response to receiving a notification deactivation, clear the notification activation variable.

7. The data storage device of claim 6, wherein selectively activating the completion status notification for the first operation comprises determining that the notification activation variable is set.

8. The data storage device of claim 1, wherein the first notification activation comprises an indication of a post operation action.

9. The data storage device of claim 8, wherein the one or more processors are further configured to, alone or in combination:
   in response to determining that the first operation is in the completed state, perform, responsive to the indication of the post operation action, the post operation action.

10. The data storage device of claim 8, wherein the post operation action comprises transitioning the device to a low power state.

11. The data storage device of claim 1, wherein the one or more processors are further configured to, alone or in combination:
    in response to determining that the first operation has reached a progress level and in response to the first notification activation, transmit, via the data port, a response data structure comprising an indication that the first operation has reached the progress level.

12. The data storage device of claim 11, wherein the first notification activation comprises an indication of the progress level.

13. The data storage device of claim 1, wherein:
prior to processing the second operation, completion status notification is active for the second operation; and
the one or more processors are further configured to, alone or in combination:
receive, via the data port and prior to processing the second operation, a notification deactivation for the second operation; and
selectively deactivate, responsive to the notification deactivation, completion status notification for the second operation.

14. The data storage device of claim 1, wherein:
the first notification activation comprises an error notification activation; and
the one or more processors are further configured to, alone or in combination, and in response to determining that the first operation is in an error state and the error notification activation, transmit, via the data port, a third response data structure comprising an indication that the first operation is in an error state.

15. The data storage device of claim 1, wherein the first notification activation is located in a header of the first command data structure.

16. The data storage device of claim 1, wherein the indication that the first operation is in the completed state is located in a header of the first response datastructure.

17. The data storage device of claim 1, wherein the data storage command set, the first command data structure, and the second command data structure are compatible with a version of a Joint Electron Device Engineering Council (JEDEC) Integrated Universal Flash Storage (UFS) Specification.

18. The data storage device of claim 1, wherein the data storage command set, the first command data structure, and the second command data structure each comprise a Universal Flash Storage (UFS) Protocol Information Unit data structure.

19. A method comprising:
receiving, via a data port of a data storage device, a first notification activation, wherein:
the data port is configured to receive and transmit, using a data storage command set, block data between a host computer system and the data storage device;
command data structures are transmitted between the host computer system as initiator and the data storage device as target in request-response operations; and
the data storage command set comprises a first command data structure, a second command data structure, and a third command data structure;
selectively activating, by the data storage device and responsive to the first notification activation, a completion status notification for a first operation;
receiving, via the data port, the first command data structure comprising a first command for the data storage device to perform a first operation;
in response to receiving the first command data structure, performing, by the data storage device, the first operation, wherein operations are defined by an in-progress state and a completed state;
in response to the activated completion status notification and determining that the first operation is in the completed state, transmitting, via the data port, a first response data structure comprising an indication that the first operation is in the completed state;
receiving, via the data port, the second command data structure comprising a second command for the data storage device to perform a second operation;
in response to receiving the second command data structure, performing, by the data storage device, the second operation;
receiving, via the data port, the third command data structure comprising a status inquiry for the second operation; and
in response to the status inquiry, transmitting, via the data port, a second response data structure comprising an indication of a state of the second operation.

20. A data storage device comprising:
a non-volatile storage medium configured to store block data for a host computer system;
a data port configured to receive and transmit, using a data storage command set, the block data between the host computer system and the data storage device, wherein:
command data structures are transmitted between the host computer system as initiator and the data storage device as target in request-response operations; and
the data storage command set comprises a first command data structure, a second command data structure, and a third command data structure; and
means to:
receive a first notification activation;
selectively activate, responsive to the first notification activation, a completion status notification for a first operation;
receive the first command data structure comprising a first command for the data storage device to perform a first operation;
in response to receiving the first command data structure, perform the first operation, wherein operations are defined by an in-progress state and a completed state;
in response to the activated completion status notification and determining that the first operation is in the completed state, transmit a first response data structure comprising an indication that the first operation is in the completed state;
receive the second command data structure comprising a second command for the data storage device to perform a second operation;
in response to receiving the second command data structure, perform the second operation;
receive the third command data structure comprising a status inquiry for the second operation; and
in response to the status inquiry, transmit a second response data structure comprising an indication of a state of the second operation.

* * * * *